United States Patent [19]
Musoff et al.

[11] Patent Number: 5,194,872
[45] Date of Patent: Mar. 16, 1993

[54] INERTIAL NAVIGATION SYSTEM WITH AUTOMATIC REDUNDANCY AND DYNAMIC COMPENSATION OF GYROSCOPE DRIFT ERROR

[75] Inventors: Howard Musoff, Brookline; Jerold P. Gilmore, Newtonville, both of Mass.

[73] Assignee: Charles Stark Draper Laboratory, Inc., Cambridge, Mass.

[21] Appl. No.: 612,788

[22] Filed: Nov. 14, 1990

[51] Int. Cl.$^5$ .............................................. H04B 7/185
[52] U.S. Cl. .................................... 342/358; 364/453; 73/1 E
[58] Field of Search ........................ 364/453; 73/1 E; 342/358

[56] References Cited

U.S. PATENT DOCUMENTS

| | | | |
|---|---|---|---|
| 3,998,409 | 12/1976 | Pistiner | 244/165 |
| 3,999,729 | 12/1976 | Muhlfelder et al. | 244/165 |
| 4,199,869 | 4/1980 | Van Steenwyk | 33/302 |
| 4,212,443 | 7/1980 | Duncan et al. | 244/177 |
| 4,230,294 | 10/1980 | Pistiner | 244/170 |
| 4,244,215 | 1/1981 | Merhav | 73/178 R |
| 4,245,498 | 1/1981 | Poquette, Jr. | 73/151 |
| 4,275,861 | 6/1981 | Hubert | 244/165 |
| 4,278,927 | 7/1981 | Grohe | 318/721 |
| 4,303,978 | 12/1981 | Shaw et al. | 364/453 |
| 4,316,394 | 2/1982 | Dohogne | 74/5.46 |
| 4,318,300 | 3/1982 | Maughmer | 73/178 R |
| 4,320,669 | 3/1982 | Grohe | 74/5.37 |
| 4,503,718 | 3/1985 | Quermann | 74/5.46 |
| 4,507,737 | 3/1985 | LaSarge et al. | 364/453 |
| 4,530,164 | 7/1985 | Barriac | 33/324 |
| 4,563,909 | 1/1986 | Carroll et al. | 74/5.5 |
| 4,711,125 | 12/1987 | Morrison | 73/178 R |
| 4,767,084 | 8/1988 | Chan et al. | 244/164 |
| 4,844,383 | 7/1989 | Hassenpflug | 244/79 |

Primary Examiner—Thomas H. Tarcza
Assistant Examiner—David Cain

[57] ABSTRACT

An inertial navigation system with automatic redundancy and dynamically calculated gyroscopic drift compensation utilizes three, two-degree of freedom gyroscopes arranged whereby any two of the gyroscopes form an orthogonal triad of measurement sensitive axes. The input axes of the three gyroscopes form three pairs of parallel input axes, each pair of parallel input axes corresponding to one axis of the orthogonal triad of axes. The three gyroscopes are operated in a plurality of preselected combinations of both clockwise and counter clockwise directions, thus changing the direction of the angular momentum vector by 180°. Parity equations are formed from each pair of gyroscope outputs whose measurement sensitive axes are parallel. The parity equations include combinations of gyroscope pairs that have been operated in both the clockwise and counterclockwise directions. Gyroscope drift estimates are then computed using the parity equations to provide individual gyroscope lumped drift corrections (self-calibration) to the inertial guidance and navigation system.

16 Claims, 2 Drawing Sheets

INERTIAL NAVIGATION SYSTEM WITH AUTOMATIC REDUNDANCY AND DYNAMIC COMPENSATION OF GYROSCOPE DRIFT ERROR

FIELD OF THE INVENTION

This invention relates to inertial navigation systems and more particularly, to such a system employing multiple, two degree-of-freedom gyroscopes providing sense axis redundancy and self-calibration of gyroscope drift errors while providing continuous navigation across the dynamic environment.

BACKGROUND OF THE INVENTION

Gyroscopes present the dominant source of navigational error in inertial navigation systems. In the most severe case, a failed gyroscope can render the navigational system completely inoperative. In all cases, navigational errors occur which are directly related to drift or bias changes in the system gyroscopes since the last calibration. Accordingly, the gyroscopes comprising the navigation system must be initially calibrated and periodically re-calibrated to account for the gyroscopes' drift over time.

If a high degree of navigational accuracy is desired, costly high performance gyroscopes having small bias drift uncertainties are used. To achieve the desired performance, gyroscopes are mounted on a gimballed platform that is used to implement a multiposition calibration. Neither solution may be attractive or even contemplated due to gyroscope cost considerations and/or gimbal configuration penalties. For example, total navigation system cost may prohibit the use of the more costly high-performance gyroscopes; while the implementation of a gimballed platform for calibrating gyroscopes is expensive, and results in considerable additional volume, weight and complexity. Further, when the vehicle is navigating, complex vehicle maneuvers and external aids as well as the additional computation complexity for the implementation of a Kalman filter are required for calibration of the gyroscopes. Additionally, the gimballed platform calibration process is very time consuming and may take up to 40 minutes to perform before the vehicle's inertial navigation system is capable of providing the desired navigational accuracy. Most importantly, during gyroscope calibration or re-calibration, the navigational functions of the inertial navigation system must be temporarily suspended.

SUMMARY OF THE INVENTION

This invention features a lower cost, higher performance, inertial navigation system having self-contained gyroscope redundancy and drift compensation which is performed at the same time that the system is performing its navigation function. Three, two-degree of freedom gyroscopes are provided. Each of the gyroscopes is disposed whereby any two gyroscopes form an orthogonal triad of sense axes thus providing automatic gyroscope redundancy should one gyroscope fail or otherwise become inoperative.

The input or sense axes of the three gyroscopes form three pairs of parallel input axes, each pair of parallel input axes corresponding to one orthogonal triad axis. At least one gyroscope output corresponding to each of the three pairs of parallel input axes are selected from which an inertial navigation unit computes the relative position of the vehicle with reference to a predetermined coordinate system.

In the preferred embodiment, the three two-degree-of-freedom gyroscopes are capable of being operated with their gyroscope rotors run in both the clockwise and counter clockwise rotational direction. This feature permits self-calibration of gyroscope drifts without interruption of navigation.

In this embodiment, the gyroscopes are selectively controlled to be operated in preselected combinations of clockwise or forward and counter clockwise or reverse directions. Gyroscope drift estimates are computed after the gyroscopes have been operated in preselected combinations of forward and reverse directions. The drift estimates are derived from parity equations that are formed from pairs of gyroscope outputs corresponding to the three pairs of parallel input axes, each pair of gyroscope outputs corresponding to one axis of the orthogonal triad of sense axes. The parity equations correspond to combinations of gyroscope pairs that have been operated in both the forward and reverse directions. The parity equations are utilized to dynamically compute and compensate for gyroscope drift errors. These compensation corrections are achieved without effecting the navigation function. The non-reversing gyro set in any time period continues to provide the navigational gyro data. The computed drift corrections are used to improve navigational performance by bounding gyro drift uncertainties.

DESCRIPTION OF THE DRAWINGS

These, and other features and advantages of the present invention will be better understood by reading the following detailed description, taken together with the drawings, wherein.

DETAILED DESCRIPTION OF THE INVENTION

Figure 1:
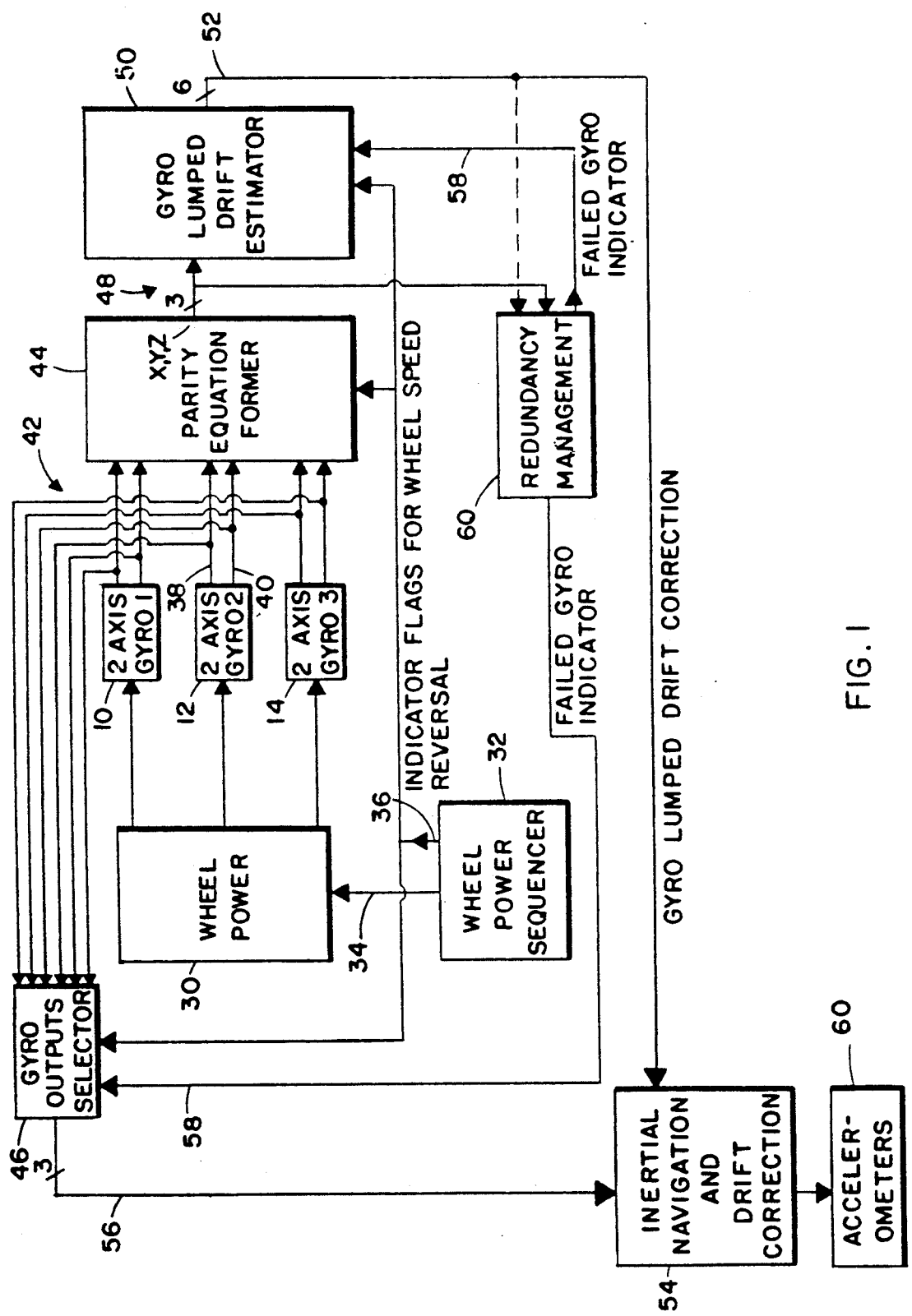
FIG. 1 is a block diagram of the inertial navigation system with continuous self-alignment according to the present invention.

There is shown in FIG. 1 the inertial navigation system with sense axis redundancy and dynamically calculated drift compensation according to the present invention includes three, two-degree of freedom gyroscopes 10–14. Such two-axis gyroscopes include wheel-reversable, tuned rotor gyroscopes available from The Charles Stark Draper Laboratory, Inc. as Model No. DTB-U. Each gyroscope includes two input axes disposed generally orthogonal to one another. The three gyroscopes of the present invention are disposed whereby any two of the gyroscopes form an orthogonal triad of axes.

Figure 2:
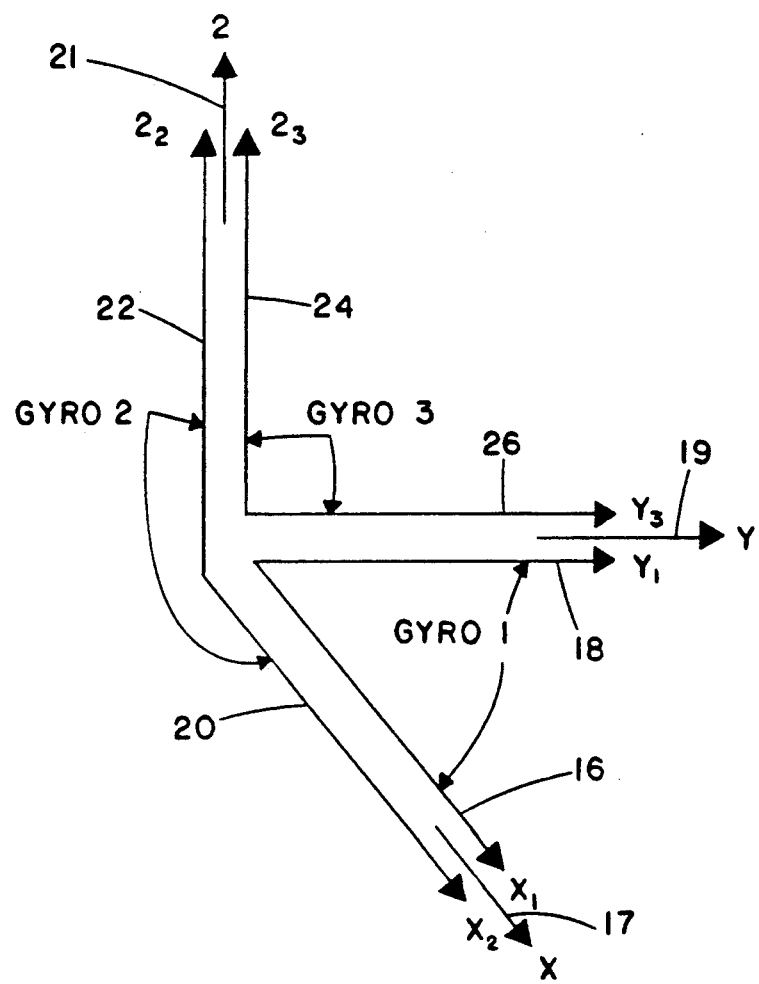
FIG. 2 is a schematic representation of the orthogonal tri-axis arrangement of the three gyroscopes according to the present invention.

An example of the orthogonal triad of axes formed by the three gyroscopes according to the present invention is shown in FIG. 2 wherein a first gyroscope is arranged with its first sense axis 16 arranged generally parallel with the X axis 17, while its second sense axis 18 is disposed generally 90 degrees from the X axis generally parallel with the Y axis 19. A second gyroscope includes a first sense axis 20 disposed along the X axis 17 and a second axis 22 disposed along the Z axis 21. Similarly, a third gyroscope also includes a first input sensitive axis 24 disposed along the Z axis 21 while a second input sensitive axis 26 is disposed parallel to the Y axis 19. Thus, any combination of two gyroscopes such as gyroscopes 1 and 2; 2 and 3; or 1 and 3 form an orthogonal triad of axes capable of performing full navigational functions when one gyroscope is being calibrated or fails, thus providing the system with inherent redundancy.

Returning to FIG. 1, power for operating the wheel of the wheel-reversable rotor gyroscopes is provided by power unit 30 which separately provides the necessary AC or DC power to gyroscopes 10-14 under control of wheel power sequencer 32. Wheel power sequencer 32 whether one or more of gyroscopes 10-14 is operating in a forward or reversed condition by means of control signal 34. Control signal 36 provides one or more indicator flags indicating whether one or more of the gyroscopes 10-14 is currently undergoing wheel reversal under control of wheel reversal sequencer 32.

Typically, wheel reversal sequencer 32 includes a microprocessor operating under control of a preselected microcode, which sequentially reverses gyroscope motor or wheel power in a preselected periodic manner as will be described in greater detail below. Changing the gyroscope's motor rotational direction results in changing the direction of the gyros angular momentum vector. This process alternately reverses the input sensitive axes of the gyroscopes in a manner that yields the same result that would have been achieved if the gyroscopes' input axes were rotated 180° by an appropriate case rotation. These rotational changes, clockwise or counter clockwise, are hereafter referred to as forward and reverse input axes directions respectively.

Each gyroscope such as gyroscope 12 includes two outputs 38 and 40 each of which corresponds to an input sensitive axis of the gyroscope and provides a signal representative of angular rate from the corresponding sense axis which is detected by the gyroscope. This signal also includes any bias drift or other error which influences the gyroscope. The outputs from all of the gyroscopes shown generally by arrow 42 are directed to parity equation former 44 and gyroscope output selector 46. Parity equation former 44 utilizes the outputs 42 from gyroscopes 10-14 and the wheel speed reversal indicator flags 36 to form three sets of parity equations; one parity equation each for the X, Y, and Z axes. One such set of parity equations is formed during each wheel power sequence generated by wheel power sequencer 32.

The parity equations are provided over signal path 48 to gyroscope lumped drift estimator 50. The gyroscope lumped drift estimator accumulates and utilizes parity equations from three time sequences as controlled by wheel power sequencer 32 and provides gyroscope lumped drift correction output 52 having an X, Y, and Z component to inertial navigation unit 54.

Gyroscope output selector 46 provides three gyroscope outputs 56 from among the six gyroscope outputs 42 under control of wheel reversal indicator flags 36 from wheel power sequencer 32, as well as failed gyroscope indicator signal 58 from redundancy management unit 60. Gyroscope output selector 46 selects gyroscope outputs which are stable and not in the process of undergoing wheel directional changes. Thus, in the absence of a failed gyro, inertial navigation can be continuously maintained regardless of any one gyroscope undergoing a selected wheel reversal. Additionally, the outputs from a failed gyro as indicated by failed gyro indicator 58 will not be selected. Inertial navigation unit 54 then utilizes the selected gyroscope outputs 56 combined with the gyroscope lumped drift corrections 52 to perform inertial navigation. Inertial navigation unit 54 also utilizes information from external sources such as accelerometers 60 to perform navigational functions.

Redundancy management unit 60 monitors the performance of the system gyroscopes in order to detect a failed or inoperative gyroscope and to eliminate the failed gyroscope from being selected by the gyroscope output selector 46 and to remove that gyroscope's parity equation from use by the gyroscope lumped drift estimator 50. In order to perform this task, redundancy management unit 60 receives, in one embodiment, the X, Y, and Z axis parity equations 48 from parity equation former 44. Alternatively, redundancy management unit 60 may utilize the gyroscope lumped drift estimates 52 from the lumped drift estimator 50 to determine whether any gyroscope has completely failed or accumulated a substantial amount of drift such that the gyroscope should be removed from service and an attempt made to stabilize and re-calibrate the gyroscope. An indication of a failed gyroscope 58 is then provided to gyroscope output selector 46 and gyroscope lumped drift estimator 50.

Figure 3:
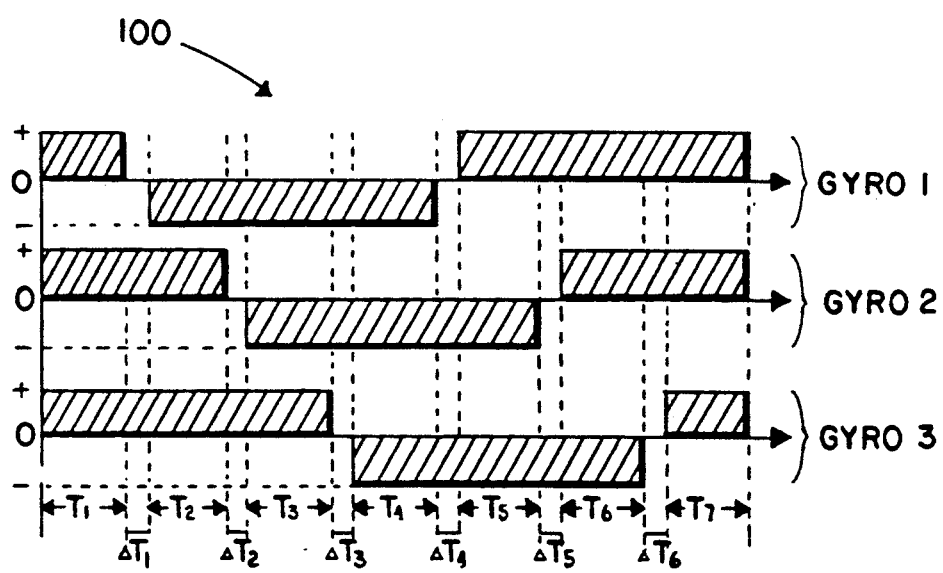
FIG. 3 is a timing diagram illustrating the timing of gyroscope wheel-reversals performed on each gyroscope.

Timing and sequence diagram 100, FIG. 3, illustrates a typical sequence of gyroscope wheel reversals. During time period $T_1$, gyroscopes 1, 2 and 3 are rotating in the forward direction as indicated by the plus sign, gyroscope 3 having previously been operated in a reverse direction immediately prior to time period $T_1$. During time period $T_1$ just before a wheel reversal, parity equation former 44 generates the first set of parity equations based on the first gyroscope wheel directional sequence. During a subsequent short time period $\Delta T_1$ of typically 20 seconds in duration, the wheel power sequencer 32 provides the appropriate control signal to wheel power unit 30 to direct the wheel of gyroscope 1 to reverse direction. Time period $\Delta T_1$ is also provided to allow gyroscope 1 to settle after wheel reversal.

During time period $T_2$, gyroscope 1 is now operating in the reverse direction while gyroscope 2 and 3 are operating in the forward direction. Immediately after $\Delta T_1$, a second set of parity equations are formed. After formation of this set of parity equations the wheel power sequencer 32 directs wheel power unit 30 to reverse the direction of gyroscope 2. Gyroscope 2 is allowed to settle during the short time period $\Delta T_2$.

During time period $\Delta T_3$ after the wheel reversal settling period $\Delta T_2$ after gyroscope 1 and gyroscope 2 have been operating in the reverse direction and gyroscope 3 is operating in the forward direction, a third set of parity equations is formed. This sequence completes the formation of a sufficient number of parity equations (after two gyroscopes have undergone a wheel directional change) to compute a full set of drift corrections. Thus, after data has been obtained immediately before and after time periods $\Delta T_1$ and $\Delta T_2$, the lumped drift estimator 50, FIG. 1 utilizes the three sets of parity equations to produce three lumped drift correction signals which are then utilized by the inertial navigation unit to correct for bias drift which has occurred since the previous lumped drift estimate was computed prior to time period $T_1$.

Wheel power sequencer 32 continues to sequence wheel power unit 30 as needed causing the gyroscopes to sequentially undergo a change in wheel direction. During each of time periods $\Delta T_4$, $\Delta T_5$ and $\Delta T_6$, three sets of parity equations are again formed as previously described with regards to $\Delta T_1$ and $\Delta T_2$. In interval $T_4$, $T_5$ and $T_6$ the direction of gyroscope 3 is reversed and, a new set of gyroscope lumped drift correction signals are produced by the gyroscope lumped drift estimator. This timing sequence continues during the entire mission being controlled by the inertial navigation unit as needed. The sequence can be continued or interrupted to be resumed later, depending on the characteristics of the gyroscope lumped drifts.

Parity equations are formed from the gyroscope outputs corresponding to the input axes that are aligned parallel to one another. Accordingly, a parity equation is formed for the $X_1$ and $X_2$ axes of gyroscopes 1 and 2 respectively, FIG. 2, while another parity equation is formed for the $Y_1$ and $Y_3$ axes of gyros 1 and 3, as well as for axes $Z_2$ and $Z_3$ of gyroscopes 2 and 3.

Whenever the rotational polarity for both gyroscope's outputs forming the given parity equation are the same (both positive or both negative), the parity equation is formed by subtracting the output of one gyroscope from the other to eliminate the common angular rate sensed by both parallel axes. When the polarities of the two gyroscopes are of an opposite sign, the parity equation is formed by adding the two gyroscope outputs to eliminate the commonly sensed angular rate.

Accordingly, during time period $T_1$ immediately before a change in wheel direction, the parity equation for the X axis gyroscopes 1 and 2 is given by $$P_1 = (X_1 - X_2) \quad (1)$$

where
- $X_1 = E$ (the angular rate signal component) $+ D_1$ ($X_1$ drift)
- $X_2 = E$ (the angular rate signal component) $+ D_2$ ($X_2$ drift)

If the lumped drifts for gyroscopes 1 and 2 are approximately constant or stay within an acceptable limit over the interval of time immediately prior to $\Delta T_1$, (e.g. $T_1$), an estimate of the difference between the X axis lumped drift may be obtained by first subtracting $X_2$ from $X_1$ which cancels or eliminates E, the angular rate signal component of $X_1$ and $X_2$. By averaging a number of parity equation outputs, the number depending on the gyroscope noise characteristics during time period $T_1$, an average of the difference between the two X axis gyroscope lumped drifts is by the formula $$\overline{P_1} = D_1 - D_2 \quad (2)$$

where
- $\overline{P_1}$ = average of parity equation (1)
- $D_1$ = average $X_1$ axis (gyroscope 1) lumped drift
- $D_2$ = average $X_2$ axis (gyroscope 2) lumped drift.

Averaging $D_1$ and $D_2$ thus compensates for any gyroscope noise detected by the signal processing system. It is important to note that the lumped drifts are corrected for known, non-varying characteristics such as scale factors, mis-alignments, and bias drifts occurring due to the wheel reversal itself.

During period $T_2$, the parity equation for the X axis of gyroscopes 1 and 2 is given by the formula $$\overline{P_2} = (X_1 + X_2) \quad (3)$$

where
- $X_1 = -E + D_1$
- $X_2 = E + D_2$

It should be noted that since gyroscope 1 has undergone a wheel reversal, the sign of the external signal component of $X_1$ is negative and therefore, the two terms must be added to cancel the external signal components thus yielding equation (3).

If the lumped drifts again are presumed to remain the same or stay within an acceptable limit over some time during period $T_2$ immediately after a wheel reversal in gyroscope 1 (after period $\Delta T_1$), an estimate of the sum of the average lumped drifts can be derived from $$\overline{P_2} = D_1 + D_2 \quad (4)$$

During period $T_3$ immediately after period $\Delta T_2$, the last time period in a sequence of wheel reversals, the parity equation for gyroscopes 1 and 2 is given by $$\overline{P_3} = (X_1 - X_2) \quad (5)$$

Assuming lumped drifts remain constant or within acceptable limits, an estimate of the difference in average lumped drifts from equation (5) is given by $$\overline{P_3} = D_1 - D_2 \quad (6)$$

Thus, separate estimates for the average lumped drifts $D_1$ and $D_2$ that are presumed generally constant over time periods, $T_1$, $T_2$ and $T_3$ in which are generally not affected by wheel reversals can be obtained from the averaged parity equations (2), (4), (6) as follows:

$$D_1 = \tfrac{1}{2}[\overline{P_2} + \tfrac{1}{2})\,\overline{P_1} + \overline{P_3})] \quad (7)$$

$$D_2 = \tfrac{1}{2}[\overline{P_2} - \tfrac{1}{2})\,\overline{P_1} + \overline{P_3})] \quad (8)$$

Alternatively, if it is desired to use only the most recent data from gyroscope 1 and 2 we can form the estimates:

$$D_1 = \tfrac{1}{2}(\overline{P_1} + \overline{P_2}) \quad (9)$$

$$D_2 = \tfrac{1}{2}(\overline{P_1} + \overline{P_2}) \quad (10)$$

Similar parity equations and average lumped drifts can be formed over periods $T_1$, $T_2$ and $T_3$ to obtain the average lumped drifts corresponding to the Y and Z input axes of the three gyroscopes. After time period $T_3$ (during time period $\Delta T_3$), the calculated estimate of the gyroscope lumped drifts from the lump drift estimator 50, FIG. 1, is provided to inertial navigation unit 54 which adjusts and corrects positional calculations obtained from the gyroscope outputs by the amount equaled to the gyroscope drift estimates thus compensating for gyroscopic drift. Accordingly, gyroscope re-calibration to compensate for gyroscopic drift can be accomplished without interrupting normal navigational functions.

The arrangement of the parity equations according to the present invention thus allows for redundant fault detection since the parity equations for a failed or faulty gyroscope will reveal abnormally high drifts as evidenced by a high $D_1$ or $D_2$ value for example in equations (7) through (10) compared to what is obtained from the parity equations of the two correctly functioning gyroscopes. The gyroscope with the abnormally high drift reading can then be switched out of the navigation computations and the system can proceed using the remaining two gyroscopes.

The computation of new lumped drift estimates can be made in the same way over the next cycle of gyroscope wheel reversals for periods $T_4$, $T_5$ and $T_6$, and then subsequently repeating the first cycle of gyroscope wheel reversals illustrated by time periods $T_1$, $T_2$ and $T_3$.

In some situations, the gyroscope lumped drifts may vary over time interval $T_n$ but may still be modelable by a polynomial in time over a cycle of wheel reversals such that during period $T_1$, using as an example a third order polynomial, a parity equation $P_1$ (13) can be formed as follows:

$$D_1 = d_{10} + d_{11}t + d_{12}t^2 + d_{13}t^3 \quad (11)$$

$$D_2 = d_{20} + d_{21}t + d_{22}t^2 + d_{23}t^3 \quad (12)$$

$$P_1 = q_{10} + q_{11}t + q_{12}t^2 + q_{13}t^3 \quad (13)$$

where
$q_{10} = d_{10} - d_{20}$
$q_{11} = d_{11} - d_{21}$
$q_{12} = d_{12} - d_{22}$
$q_{13} = d_{13} - d_{23}$ A least square estimator can be used to extract the co-efficients of the parity equation polynomial (equation 13). A similar procedure may be used for time periods $T_2$ and $T_3$ such that $$P_2 = q_{20} + q_{21}t + q_{22}t^2 + q_{23}t^3 \quad (14)$$

$$P_3 = q_{30} + q_{31}t + q_{32}t^2 + q_{33}t^3 \quad (15)$$

where the coefficients in equations (14) and (15) are also extracted by least squares method. Accordingly, the overall drift coefficients of equations (11) and (12) may be computed from $$d_{10} = 1/2 \, [q_{20} + 1/2 \, (q_{10} + q_{30})] \quad (16)$$
$$d_{21} = 1/2 \, [q_{21} + 1/2 \, (q_{11} + q_{31})]$$
$$\cdot \quad \cdot \quad \cdot$$

$$d_{20} = 1/2 \, [q_{20} - 1/2 \, (q_{10} + q_{30})] \quad (17)$$
$$d_{21} = 1/2 \, [q_{21} - 1/2 \, (q_{11} + q_{31})]$$
$$\cdot \quad \cdot \quad \cdot$$

The method outlined above for extracting gyroscope drift holds true only if the lumped drifts do not vary by more than a pre-determined, acceptable margin over the time period $T_n$ that is being estimated. Changes in drifts or lumped drift models over the time period of interest generally arises from changes in gyroscopic error modeling force functions such as specific force and angular rate. Thus, measurable criteria can be developed based on the change in measured specific force or change in angular rate over the lumped drift estimation interval $T_n$ by which the system may decide whether the estimated lumped drifts are valid and usable for retroactive error correction or whether the lumped drift estimate should be discarded in anticipation of a new drift estimate obtained from the succeeding drift estimation interval.

Modifications and substitutions to the present invention by one of ordinary skill in the art are considered to be within the scope of the present invention which is not to be limited except by the claims which follow.

What is claimed is:

1. An inertial navigation system, with inherent redundancy comprising:

three, two-input axis wheel-reversable rotor gyroscopes, each of said gyroscopes disposed whereby any two of said gyroscopes provide three orthogonal sense axes, each of said gyroscopes including at least two outputs for providing first and second output signals corresponding to sensed angular rates along said two input axes, and wherein said input axes of said three gyroscopes form three pairs of parallel input axes, each pair of parallel input axes corresponding to one of said orthogonal sense axes;

means for selecting at least three gyroscope output signals, each of said selected gyroscope output signals corresponding to one gyroscope output from one associated gyroscope input axis selected from each of said three pairs of parallel input axes; and inertial navigation means, responsive to at least said three selected gyroscope output signals, for computing the relative position of a vehicle with reference to a predetermined coordinate system.

2. The system of claim 1 wherein said three gyroscopes include three, two-degree of freedom, wheel-reversable, tuned rotor gyroscopes.

3. The system of claim 2 further including means for powering each of said gyroscopes to operate in one of a forward and a reverse direction.

4. The system of claim 3 further including means for selectively controlling said means for powering, for operating each of said three gyroscopes in a plurality of preselected combinations of forward and reverse directions.

5. The system of claim 4 further including means, responsive to said means for selectively controlling and to said outputs of each of said gyroscopes, for computing an estimate of the gyroscopic drift of each of said gyroscopes.

6. The system of claim 5 wherein said means for computing computes and estimate of the gyroscopic drift utilizing output signals from each gyroscope obtained after each of said gyroscopes has been operated in a reverse direction.

7. The system of claim 5 wherein said means for computing includes parity equations formed from pairs of outputs of said gyroscopes corresponding to said three pairs of parallel input axes, each pair of parallel input axes corresponding to one of said three orthogonal sense axes.

8. The system of claim 5 wherein said means for computing further includes means for indicating one of said gyroscopes is inoperative.

9. The system of claim 2 wherein said inertial navigation means computes the position of said navigation means generally simultaneously with one or more of said gyroscopes operating in a reverse direction.

10. An inertial navigation system, with sense axis redundancy and dynamically calculated gyroscopic drift compensation, comprising:

three, two-input axis, wheel-reversable gyroscopes, each of said gyroscopes disposed whereby any two of said gyroscopes provide three orthogonal sense axes, each of said gyroscopes including at least two outputs for providing first and second output signals corresponding to sensed changes in angular rates along said two gyroscope input axes, and wherein said input axes of said three gyroscopes form three pairs of parallel input axes, each pair of parallel input axes corresponding to one of said three orthogonal axes;

means for powering each of said gyroscope wheels to operate in one of a forward and a reverse direction;

means for selectively controlling said means for powering, for operating said three gyroscopes in a plurality of preselected combinations of forward and reverse directions;

means for selecting at least three gyroscope outputs, each of said selected gyroscope output corresponding to one gyro input axis from each of said three pairs of parallel input axes;

means, responsive to said means for selectively controlling and to said outputs of each of said gyroscopes, for computing an estimate of the gyroscopic drift of each of said gyroscopes; and inertial navigation means, responsive to at least said three selected gyroscope outputs, for computing the relative position of a vehicle with reference to a predetermined coordinate system.

11. A method of dynamically compensating for gyroscopic drift in an inertial navigation system including at least two gyroscopes, each gyroscope including at least one input sensitive axis disposed parallel to a plurality of reference axes of an inertial navigation system, comprising the steps of:

receiving at least first and a second gyroscope output signals from at least first and second gyroscopes including first and second gyroscope inputs disposed parallel to at least one reference axis of the inertial navigation system, each of said at least first and second gyroscope output signals including a sensed angular rate component and a gyroscopic error component;

forming at least one parity equation such that said angular rate component of one of said first and second gyroscope output signals generally cancels said angular rate component of the other of said first and second gyroscope output signals; and utilizing the gyroscopic error components of said first and second gyroscope output signals to provide said inertial navigation system with an estimate of gyroscopic error about said reference axis.

12. The method of claim 11 wherein the step of forming at least one parity equation includes forming at least one polynomial parity equation.

13. The method of claim 11 wherein said inertial navigation system includes an orthogonal triad of reference axes and wherein said navigational system further includes at least three, two-degree of freedom gyroscopes, and whereby the gyroscope input axes form three pairs of input axes parallel to the triad of orthogonal axes.

14. The method of claim 13 wherein the step of forming at least one parity equation includes forming three parity equations, one parity equation for each pair of gyroscope output axes disposed parallel to each inertial navigation system reference axis from among the orthogonal triad of reference axes.

15. The method of claim 14 further including prior to the step of forming at least one parity equation the step of sequentially performing gyroscope wheel reversals.

16. The method of claim 15 wherein the step of utilizing the gyroscopic error component of the gyroscope output signals to provide an estimate of lumped gyroscopic error provides an estimate of lumped gyroscopic error after each of said gyroscopes have undergone at least one period of wheel reversal.

* * * * *

UNITED STATES PATENT AND TRADEMARK OFFICE
CERTIFICATE OF CORRECTION

PATENT NO. : 5,194,872
DATED : March 16, 1993
INVENTOR(S) : Howard Musoff, et al.

It is certified that error appears in the above-indentified patent and that said Letters Patent is hereby corrected as shown below:

Column 5, line 55, "$P_1 = D_1 - D_2$" should read

--$\overline{P_1} = D_1 - D_2$--.

Column 6, line 18, "$P_2 = D_1 + D_2$" should read

--$\overline{P_2} = D_1 + D_2$--.

Column 8, line 19, "said orthogonal" should read
--said three orthogonal--.

Column 9, line 11, "orthogonal axes" should read
--orthogonal sense axes--.

Signed and Sealed this

Thirty-first Day of May, 1994

Attest:

BRUCE LEHMAN

*Attesting Officer*  *Commissioner of Patents and Trademarks*